United States Patent Office 3,361,186
Patented Jan. 2, 1968

3,361,186
METHOD FOR HEATING AND EVAPORATING AQUEOUS SOLUTIONS
Bernard S. Wildi, Kirkwood, Mo., and William B. Tuemmler, Catonsville, Md., assignors to Monsanto Company, St. Louis, Mo., a corporation of Delaware
No Drawing. Original application Nov. 15, 1955, Ser. No. 547,044, now Patent No. 3,099,630, dated July 30, 1963. Divided and this application July 13, 1962, Ser. No. 209,782
4 Claims. (Cl. 159—47)

This invention relates to a novel method for increasing the rate of absorption of radiant energy by water, and for converting said radiant energy to thermal energy. The invention also relates to a novel method for increasing the rate of evaporation of water from aqueous solutions by the use of radiant energy, particularly solar energy.

There are numerous occasions where the absorption of radiant energy by water or aqueous solutions becomes of considerable importance. One outstanding example is the recovery of dissolved solids or fresh water from sea water by solar evaporation. Solar evaporation can also be utilized in the same manner with respect to aqueous solutions or waste waters produced in industrial plants. Solar energy, or other forms of radiant energy of comparable wave lengths, can also be utilized for heating water or aqueous solutions. All of these and similar operations are considerably enhanced by the practice of the present invention, which involves the addition of small amounts of particular additives to water or aqueous solutions to greatly increase the efficiency of absorption of radiant energy into such solutions.

It has now been found that the effectiveness of heating and evaporating water or aqueous solutions can be very greatly increased by dissolving in the water or aqueous solution a small amount of one or more of the materials defined and described more fully immediately below. The exact amounts of these materials to be used will vary somewhat with the particular material selected, in some cases as little as one or two parts per million being sufficient. It is generally desirable to use at least about one part per million. A preferred range of concentrations comprises between about 3 and about 25 parts per million.

The materials used according to the present invention are water-soluble phthalocyanine dyes and water-soluble polymethine dyes. The polymethine dyes are defined as ammonium salts containing a polymethine chain, $$=CH(-CH=CH)_n-$$

terminating at either end with a nitrogen atom. A part of the polymethine chain can be included in a ring system, either aromatic or otherwise. The $n$ in the foregoing polymethine chain formula can be any integer, including 0, but will preferably be a relatively small number, for example, not greater than about 5.

Polymethine dyes as a general class are water-insoluble compounds. They are solubilized by forming salts of strong proton acids containing hydrophilic groups (e.g., carboxyl groups, hydroxyl groups, sulfonic acid groups, polyalkoxy groups, etc.) in excess of the acid function which is neutralized by the polymethine cation. Examples of solubilizing acids suitable for water-soluble polymethine dye salt formation are polycarboxylic (including di- carboxylic) acids, such as adipic acid, succinic acid, maleic acid, polymers of acrylic and/or methacrylic acids, hydrolyzed copolymers of ethylene, isobutylene, etc. and unsaturated cyclic anhydrides such as maleic anhydride, etc.; polysulfonic acids, and particularly aromatic sulfonic acids, such as sulfonated polystyrene, etc.; and similar strong proton acids having a multiplicity of hydrophilic acid groups per molecule. The foregoing polyacids should be combined with the polymethine bases described herein in amounts such that not more than about 75 percent, and preferably not more than about 30 percent, of the hydrophilic groups are neutralized by the polymethine bases. After formation of the water-soluble polymethine salt, the remaining free acid groups can be neutralized with metallic hydroxides such as the alkali metal or ammonium hydroxides, which will in many instances increase the water-solubility of the polymethine salt.

Another class of suitable water-solubilizing acids comprise hydroxy, and especially polyhydroxy, mono and polycarboxylic and sulfonic acids, such as citric acid, gluconic acid, mucic acid, saccharic acid, hydroxyadipic acid, malic acid, p-hydroxybenzenesulfonic acid, naphthol, disulfonic acids, etc.; other suitable water-solubilizing acids are those having the general formula, $$A-R-(O-Alkyl)_x-OH$$

where A is an acid group, such as a carboxyl or sulfonic acid group; R is a hydrocarbyl group, such as an aryl group, an alkyl group, an alkaryl group, aralkyl group, etc.; the $-(O-Alkyl)_x-$ is a polyalkoxy chain such as is derived from ethylene oxide, propylene oxide or the like; and $x$ is an integer from 1 to as high as 50, inclusive, and preferably from about 5 to about 20, inclusive. Examples of such compounds are the polyalkylene oxide derivatives of acids such as salicylic acid, glycolic acid, naphtholsulfonic acid, p-hydroxyphenylpropionic acid, etc.

The polymethines employed in the present invention can be classified in three categories: (a) compounds in which each of the nitrogen atoms at the termini of the polymethine chain is a part of a heterocyclic ring system; these compounds are generally called cyanines; (b) compounds in which only one of the nitrogen atoms at the termini of the polymethine chain is in a heterocyclic ring system; these compounds are generally called hemicyanines; (c) compounds in which neither of the nitrogen atoms at the termini of the polymethine chain is in a heterocyclic ring system; these compounds are referred to hereinafter as "non-cyanine polymethines." This latter type of polymethine constitutes a novel and particularly preferred class of compounds for use according to the present invention.

These preferred non-cyanine polymethine compounds can be represented by the following general formula:

wherein $n$ is an integer, including 0, and $X^-$ is an anion of any of the strong proton acids discussed above. An example of a salt of this class is the citrate salt of the polymethine base obtained by the alkylation of the dianilide of glutaconic aldehyde, which gives the following compound:

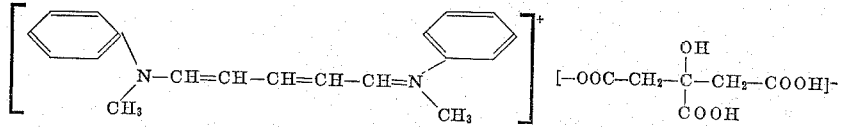

A further preferred class of the immediately preceding polymethine compounds are the following, in which two aromatic ring systems are a part of the polymethine chain:

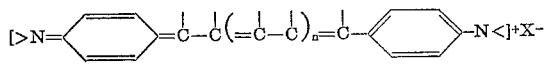

wherein $n$ and $X^-$ are as described above.

The identity of other substituents in the molecule—i.e., substitutions upon the essential structure shown above—is of relatively little importance. Preferred substituents for attachment to the terminal nitrogen atoms are alkyl hydrocarbyl groups, especially lower alkyl groups such as methyl, ethyl, isopropyl, n-propyl, n-butyl, 2-ethylhexyl, etc., but other substituents such as hydrogen atoms or other higher alkyl groups such as cetyl or stearyl groups, other hydrocarbyl groups such as alkenyl, aryl, aralkyl or alicyclic radicals, or hydrocarbyl radicals substituted with groups such as hydroxy, alkoxy, sulfonic acid, halo (especially chloro), amino, and nitro groups, etc. are also suitable.

Preferred substituents for attachment to the terminal methine carbon atoms are aryl groups, especially aryl groups substituted with halo (particularly chloro), amino, hydroxy, alkoxy, N-alkyl and N,N-dialkylamino groups, etc., but other substituents such as those mentioned with respect to the nitrogen atom substituents of the foregoing paragraph are also suitable.

Preferred substituents for attachment to the non-terminal methine carbon aoms are hydrogen atoms or lower alkyl groups such as mentioned above, but other substituents, e.g., those listed in the preceding two paragraphs are acceptable—and under some circumstances even desirable.

Examples of typical compounds of the non-cyanine polymethine class are 1,3-bis(4-aminophenyl)vinylcarbonium dihydrogen citrate;
1,5-bis(4-aminophenyl)divinylcarbonium gluconate;
1,7-bis-(4-aminophenyl)trivinylcarbonium acid mucate;
1,5-bis[4-(N,N-dimethylamino)phenyl]-3,4-dimethyl-divinylcarbonium hydrogen saccharate;
1-[4-(N,N-diethylamino)phenyl]-7-[4-(N,N-dimethylamino)phenyl]-1-phenyl-3-ethyl-7-(4-chlorophenyl)-trivinylcarbonium hydrogen adipate;
1,1,5,5-tetrakis[4-(N,N-dimethylamino)phenyl]-3-(4-chlorophenyl)divinylcarbonium hydrogen hydroxy-adipate;
1,7-bis{4-[N,N-di(2-hydroxyethyl)amino]phenyl}-1,7-bis(2-chloroethyl)-4-(4-nitrophenyl)trivinylcarbonium hydrogen succinate;
the 1,1,7,7-tetrakis[4-(N,N-diethylamino)phenyl]trivinylcarbonium salt of a sulfonated polystyrene having a molecular weight of approximately 10,000, in which approximately half of the sulfonic acid groups are neutralized by the carbonium base and the remainder are neutralized by sodium hydroxide; 1,5-bis-[4-(N-methylamino)phenyl]-1-(4-chlorophenyl)divinylcarbonium hydrogen maleate; etc.

A typical method by which the immediately foregoing and similar polymethine compounds can be prepared involves the reaction of equimolar quantities of a p-aminophenyl alkene of the class

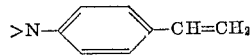

and a p-aminophenyl aldehyde (or ketone) of the class

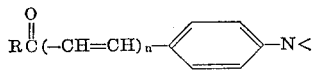

wherein $n$ is equal to an integer including 0, and wherein R may be either a hydrogen atom or an organic radical. These materials are allowed to react in a non-aqueous solvent such as acetic acid or acetic anhydride, and the acid (the salt of which it is desired to form) is added to the reaction mixture. It is believed that an allene compound of the type

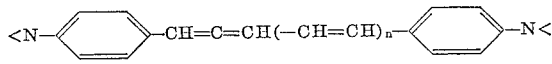

is formed as an intermediate which then reacts with the acid to form the desired polymethine salt.

In some cases it may be more convenient to first form the above salt of a strong inorganic acid, e.g., perchloric acid, and then convert the inorganic salt to the water-soluble salt. This can be done by suspending the inorganic acid salt with an equivalent of a strong inorganic base, such as sodium hydroxide, in a benzene-water mixture to convert the salt to the colorless dye base. The benzene layer (containing the colorless dye base) is washed with water and then dried, e.g. over sodium sulfate. The resulting benzene solution is then mixed with an excess of aqueous solution of one of the solubilizing acids described above, and the benzene is boiled off leaving an aqueous solution of the water-soluble dye of the present invention.

An alternative method of preparation which can be used in making symmetrical non-cyanine polymethines having 5 or more methine carbon atoms in the polymethine chain involves the reaction of two molar proportions of a p-aminophenylalkene of the class

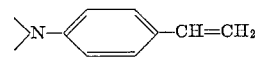

with one mole of an ortho ester (or vinylogue thereof) of the class

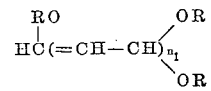

wherein $n_1$ is an integer, including 0. The procedure to be followed in this method is very much like the above-described method in that the reactants are allowed to react in a non-aqueous solvent with the addition of a strong inorganic acid to form the carbonium salt, which is then converted to the water-soluble salt by the same general procedure outlined above.

The cyanine dye salts suitable for use according to the present invention can be readily prepared by formation of the strong inorganic acid salts according to well-known prior art methods, followed by conversion to the water-solubilizing acid salts by the same general procedures outlined above with respect to the non-cyanine polymethine dye salts.

The water-soluble cyanine salts employed in this invention include not only the classical cyanines, in which both of the terminal nitrogen atoms are in heterocyclic rings, but also the so-called hemicyanines, in which one of the nitrogen atoms is in a heterocyclic ring and one is not. While the term cyanine was originally applied only to compounds in which the nitrogen-containing rings were quinoline rings, the term cyanine is now used in a broader sense to include other heterocyclic nitrogen-containing ring systems such as pyridines, indoles, benzothiazoles, benzoseleneazoles, thiazolenes, benzoxazoles, α- and β-naphthothiazoles, and the like—and the term as used with respect to the present invention is intended to include these latter nitrogen-containing heterocyclic ring systems.

Examples of suitable water-soluble cyanine dye salts for use in the present invention are the succinic acid salt of Quinoline Blue, the saccharic acid salt of Sensitol Green, the citric acid salt of Dicyanine, the gluconic acid salt of Kryptocyanine, the hydroxyadipic acid salt of Xenocyanine, the polyacrylic acid salt of 3,3'-dimethyl-thiacarbocyanine, the maleic acid salt of Bau 2000, the sulfonated polystyrene salt of Astra Violet FF Extra, the maleic acid salt of Astrazon Yellow 3G, etc.

The water-soluble phthalocyanine dyes used according to this invention are phthalocyanines which have been modified by forming sulfonic acid derivatives or salts thereof, sulfonamide derivatives, carboxylic acid derivatives or salts thereof, quaternary ammonium and ternary sulfonium salts, and the like. Examples of such water-soluble phthalocyanines are Heliogen Blue SBL, Durazol Fast Blue 8GS, Zapon Fast Blue HL, Sirium Light Green FFGL, copper octapyridinylacetyltetraaminophthalocyanine octachloride, etc.

The immediately following examples (Examples 1 through 13) are illustrative of the synthesis of inorganic acid salts of non-cyanine polymethine dyes from which the novel water-soluble polymethine dyes can be prepared.

The water-soluble polymethine salts are disclosed and claimed in our copending application Ser. No. 547,044, filed Nov. 15, 1955, now U.S. Patent No. 3,099,630, of which the instant invention is a divisional application.

EXAMPLE 1

*1,1,3,3-tetrakis[4-(N,N-dimethylamino)phenyl]vinylcarbonium perchlorate*

A mixture of 1.33 grams of 1,1-bis[4-(N,N-dimethylamino)phenyl]ethylene and 1.33 grams of 4,4'-bis(N,N-dimethylamino)benzophenone was treated with 10 ml. of phosphorus oxychloride. Reaction began immediately, with the evolution of heat and the development of a dark green-blue color. The mixture was placed on a steam bath for 5 hours, during which time the mixture turned red. Fifteen ml. of acetic acid was then added to the cooled mixture, which was then poured into 250 ml. of distilled water. The resulting dark red solution was treated with 3.0 grams of potassium perchlorate, followed by the gradual addition of solid sodium acetate until the mixture assumed a blue-green color and a precipitate began to form. The mixture was allowed to stand at room temperature for about an hour, during which time a dark purple solid formed. This solid was collected, washed with water and dissolved in warm methanol to give a deep blue solution which was then treated with 200 ml. of ether. Upon cooling the ether mixture, a precipitate was collected. Further washing with ether gave a 46 percent yield (based upon the benzophenone) of reddish-brown 1,1,3,3 - tetrakis[4-(N,N-dimethylamino)phenyl]vinylcarbonium perchlorate, melting with decomposition at about 238° C.

EXAMPLE 2

*1,1,5,5-tetrakis[4-(N,N-dimethylamino)phenyl]divinylcarbonium perchlorate*

Twenty-two and one-tenth grams of 1,1-bis[4-(N,N-dimethylamino)phenyl]ethylene and 8.3 ml. of ethyl orthoformate were mixed in 50 ml. of acetic anhydride to form a slurry. To this slurry there was added 5.57 grams of 72 percent aqueous perchloric acid dissolved in 50 ml. of acetic anhydride. The resulting mixture was heated, with gentle agitation, until the mixture became homogenous. The mixture was allowed to stand for about 2½ hours, after which time an additional 8.3 ml. of ethyl orthoformate was added. After an additional 45 hours the precipitated solid was collected and washed consecutively with acetic acid and ether. There was obtained a 96 percent yield of golden-brown 1,1,5,5-tetrakis[4-(N,N-dimethylamino)phenyl]divinylcarbonium perchlorate, melting with decomposition at 228–229.5° C.

EXAMPLE 3

*1,1,7,7-tetrakis[4-(N,N-dimethylamino)phenyl]trivinylcarbonium perchlorate*

To a mixture of 1.33 grams of 1,1-bis[4-(N,N-dimethylamino)phenyl]ethylene and 0.5 ml. of 1,3,3-trimethoxypropene was added 5 ml. of acetic acid followed by 0.31 grams of 72 percent aqueous perchloric acid dissolved in 5 ml. of acetic anhydride. Reaction started immediately, with the evolution of heat and development of an intense blue-black color. The mixture was allowed to stand at room temperature for about 2½ hours, after which time another 0.5 ml. of trimethoxypropene was added. After an additional one and one-half hours 30 ml. of anhydrous ether was added and the mixture was cooled to form a solid precipitate. The precipitate was washed with a total of 50 ml. of a 1:4 mixture of acetic anhydride and ethyl ether, washed further with pure ether, and then dried in a vacuum to give a 96 percent yield (based on perchloric acid) of finely divided, brown 1,1,7,7-tetrakis[4-(N,N-dimethylamino)phenyl]trivinylcarbonium perchlorate, melting with decomposition at 224–226° C.

EXAMPLE 4

*1,3-bis[4-(N,N-dimethylamino)phenyl]-1,3-bis(phenyl)-vinylcarbonium perchlorate*

A mixture of 2.23 grams of 1-phenyl-1-[4-(N,N-dimethylamino)phenyl]ethylene, 2.25 grams of 4-(N,N-dimethylamino)benzophenone and 20 ml. of phosphorus oxychloride was heated, with agitation, for 5 hours at about 100° C. The resulting deep red mixture was cooled, treated with 28 ml. of acetic acid, poured into 500 ml. of distilled water, and treated with 6 grams of sodium perchlorate, followed by gradual addition of solid sodium acetate until a precipitate formed. The precipitate was separated from the mixture, redissolved in warm ethanol and slowly cooled to give a precipitate of bronze crystals. These crystals were washed first with ice-cold ethanol, then with ether, and then dried to give a golden-brown solid, melting at 150–160° C. Further purification by boiling in 100 ml. of absolute alcohol, cooling the mixture to room temperature, collecting the resulting coppery precipitate, repeatedly washing the precipitate with ethanol and ether, and drying in a vacuum gave 1,3-bis[4-(N,N-dimethylamino)phenyl]-1,3 - bis(phenyl)vinylcarbonium perchlorate, melting with decomposition at 204–207° C.

EXAMPLE 5

*1,5-bis[4-(N,N-dimethylamino)phenyl]-1,5-bis(phenyl)divinylcarbonium perchlorate*

A mixture of 11.2 grams of 1-[4-(N,N-dimethylamino)phenyl]-1-phenylethylene, 5.0 ml. of ethyl orthoformate and 25 ml. of acetic anhydride was treated with a solution of 3.30 grams of 72 percent aqueous perchloric acid in 25 ml. of acetic anhydride. This mixture was heated in a water bath at about 85–95° C. for one hour, after which another 5.0 ml. of ethyl orthoformate was added. The mixture was then allowed to stand at room temperature for three hours, after which it was treated with acetic acid and ether to form a precipitate which was collected and washed with acetic acid followed by ether to give a crude rust-colored product. The product was further purified by dissolving in 250 ml. of boiling acetic acid, filtering, reheating and allowing to cool slowly. A precipitate was formed upon cooling, which, after washing consecutively with acetic acid, ethanol and ether, gave large golden-brown crystals of 1,5-bis[4-(N,N-dimethylamino)phenyl] - 1,5 - bis(phenyl)divinylcarbonium perchlorate, melting with decomposition at 210–211° C.

EXAMPLE 6

*1,7-bis[4-(N,N-dimethylamino)phenyl]-1,7-bis(phenyl)trivinylcarbonium perchlorate*

A mixture of 2.23 grams of 1-[4-(N,N-dimethylamino)phenyl]-1-phenylethylene, 1.0 ml. of 1,3,3-trimethoxypropene and 5 ml. of acetic anhydride was treated with a solution of 0.65 grams of 72 percent aqueous perchloric acid dissolved in 10 ml. of acetic anhydride. The mixture was agitated at room temperature for about 3 minutes, and then chilled in ice for 15 minutes. A precipitate formed, which was separated from the mixture, washed consecutively with ethanol and ether and then dried. The resulting product, 1,7-bis[4-(N,N-dimethylamino)phenyl] - 1,7-bis(phenyl)trivinylcarbonium perchlorate, melting with decomposition at 180–181° C., was obtained in about 56 percent yield, based upon perchloric acid.

EXAMPLE 7

*1,1,3-tris[4-(N,N-dimethylamino)phenyl]-3-(phenyl)-vinylcarbonium perchlorate*

A mixture of 1.33 grams of 1,1-bis[4-(N,N-dimethylamino)phenyl]ethylene, 1.13 grams of 4-(N,N-dimethylamino)benzophenone and 10 ml. of phosphorus oxychloride was heated for 5 hours at about 100° C. The resulting dark red mixture was cooled, treated with 15 ml. of acetic acid, and poured into 250 ml. of water containing about 3 grams of sodium perchlorate. Solid sodium acetate was gradually added to the resulting dark reddish-brown mixture until a precipitate had formed and the solution had a blue-green appearance. The precipitate was separated from the solution, washed thoroughly with distilled water and dried. Further purification of the crude product by dissolution in 50 ml. of pyridine, precipitation by addition of 100 ml. of ether, and finally recrystallization from 175 ml. of absolute alcohol yielded golden-brown 1,1,3 - tris[4 - (N,N-dimethylamino)phenyl] - 3-(phenyl)vinylcarbonium perchlorate, melting with decomposition at 210–212° C.

EXAMPLE 8

*1,1,3-tris[4-(N,N-dimethylamino)phenyl]vinylcarbonium perchlorate*

A mixture of 1.33 grams of 1,1-bis[4-(N,N-dimethylamino)phenyl]ethylene and 1.2 grams of 4-(N,N-dimethylamino)benzaldehyde was treated with 10 ml. of acetic acid, followed by a mixture of 0.65 grams of 72 percent aqueous perchloric acid dissolved in 10 ml. of acetic anhydride. The resulting blue solution was allowed to stand at room temperature for about 5 days. Ether was added and the mixture was allowed to stand another day during which time a solid precipitated from the solution. The precipitate was collected, washed with ether and recrystallized by dissolving in 50 ml. of warm acetic anhydride, followed by cooling and dilution with about 50 ml. of ether. The mixture was chilled, and the resulting precipitate was collected and repeatedly washed with ether. Further purification by recrystallization from 25 ml. of acetic acid, boiling in 100 ml. of ethanol, cooling, and recrystallizing from 150 ml. of absolute alcohol yielded finely divided, green 1,1,3-tris[4-(N,N-dimethylamino)phenyl]vinylcarbonium perchlorate, melting with decomposition at 195.5–197.0° C.

EXAMPLE 9

*1,5-bis[4-(N,N-dimethylamino)phenyl]-1,5-bis(4-chlorophenyl)divinylcarbonium perchlorate*

A mixture of 1.29 grams of 1-[4-(N,N-dimethylamino)phenyl]-1-(4-chlorophenyl)ethylene, 1.0 ml. of ethyl orthoformate and 5.0 ml. of acetic anhydride was treated with a solution of acetic anhydride. The mixture was allowed to stand at room temperature for about 10 minutes. It was then heated on a steam bath for 7 minutes, cooled, and chilled in ice. A dark precipitate was collected and washed with ether and recrystallized from 80 ml. of acetic acid. Further purification by washing consecutively with acetic acid and ether, followed by drying, yielded red-brown, coppery crystals of 1,5-bis[4-(N,N-dimethylamino)phenyl] - 1,5 - bis(4-chlorophenyl)divinylcarbonium perchlorate, melting at 217–219° C.

EXAMPLE 10

*1,7-bis[4-(N,N-dimethylamino)phenyl]-1,7-bis(2,4-dichlorophenyl)trivinylcarbonium perchlorate*

A mixture of 5.84 grams of 1-[4-(N,N-dimethylamino)phenyl]-1-(2,4-dichlorophenyl)ethylene, 2.0 ml. of 1,3,3-trimethoxypropene and 10 ml. of acetic anhydride was treated with 1.36 grams of 72 percent aqueous perchloric acid dissolved in 10 ml. of acetic anhydride. Reaction began immediately, as evidenced by evolution of heat and formation of a bronze precipitate. After less than a minute, the mixture was cooled, treated with ether, and the precipitate was collected. The precipitate was washed consecutively with ethanol and ether to given brown 1,7-bis - [4 - (N,N - dimethylamino)phenyl]-1,7-bis(2,4-dichlorophenyl)trivinylcarbonium perchlorate, melting at 203–204° C.

EXAMPLE 11

*1,7-bis[4-(N,N-dimethylamino)phenyl]-1,7-bis(4-chlorophenyl)trivinylcarbonium perchlorate*

A mixtude of 5.2 grams of 1-[4-(N,N-dimethylamino)phenyl]-1-(4-chlorophenyl)ethylene, 2.0 ml. of freshly distilled 1,3,3-trimethoxypropene and 10 ml. of acetic anhydride was treated with a solution of 1.36 grams of 72 percent aqueous perchloric acid in 20 ml. of acetic anhydride. Immediate reaction was evidenced by considerable evolution of heat and precipitation of a solid product. After 1 minute the mixture was cooled in ice, and ether was added. The precipitate was collected, washed with ethanol and then washed with ether to yield reddish-brown, crystalline 1,7 - bis[4 - (N,N - dimethylamino)phenyl] - 1,7 - bis(4 - chlorophenyl)trivinylcarbonium perchlorate, melting with decomposition at 195–196° C.

EXAMPLE 12

*1,1,5,5-tetrakis[4-(N-benzyl-N-methylamino)phenyl]divinylcarbonium perchlorate*

A mixture of 5 grams of 1,1-bis[4-(N-benzyl-N-methylamino)phenyl]ethylene, 1.5 ml. of ethyl orthoformate and 15 ml. of acetic anhydride was treated with a solution of 0.83 gram of 72 percent aqueous perchloric acid in 15 ml. of acetic anhydride. The resulting deep blue mixture was warmed briefly to dissolve all of the solids, and then allowed to stand overnight, during which time a precipitate was formed. Further agitation caused rapid crystallization of a coppery solid. The precipitate was collected and washed first with acetic acid and then with ether. Further purification was carried out by dissolving the precipitate in acetone, filtering the solution and then adding ethanol to the filtrate. Most of the acetone was then boiled off, and the solution was allowed to stand several days during which time lustrous, purple-red crystals separated. This solid was washed with ethanol and dried to give 1,1,5,5-tetrakis[4-(N-benzyl-N-methylamino)phenyl]divinylcarbonium perchlorate, melting at 135–137° C.

EXAMPLE 13

*1,5-bis[4-(N,N-dimethylamino)phenyl]-1,5-bis(2,4-dichlorophenyl)divinylcarbonium perchlorate*

A mixture of 2.9 grams of 1-[4-(N,N-dimethylamino)phenyl]-1-(2,4-dichlorophenyl)ethylene, 1.0 ml. of ethyl orthoformate and 5 ml. of acetic anhydride was treated with a solution of 0.68 gram of 72 percent aqueous perchloric acid in 5 ml. of acetic anhydride. The mixture was allowed to stand at room temperature for several minutes, then was warmed for 3 or 4 minutes and then was cooled and poured into water, whereupon a black tar-like material separated from the solution. The tar-like material was dissolved in acetone, and a reddish-brown crystalline material was precipitated by the addition of a little ether. This crystalline material was collected, washed with ether, recrystallized from acetic acid and further recrystallized from ethanol to yield golden needles of 1,5-bis[4-(N,N-dimethylamino)phenyl]-1,5-bis(2,4 - dichlorophenyl)divinylcarbonium perchlorate, melting with decomposition at about 230° C.

The strong inorganic acid salts of the polymethine dyes prepared as described in the foregoing examples can be readily converted to the water-soluble salts employed in the present invention in accordance with the general procedure set forth in an earlier portion of this disclosure. Specific examples representative of the general procedure are set forth in the following Examples 14 through 19.

EXAMPLE 14

*Preparation of 1,1,5,5-tetrakis[4-(N,N-dimethylamino)phenyl]divinylcarbonium salt of sulfonated polystyrene*

Symmetrical pentamethine perchlorate prepared as described in Example 2, above, was converted to the free base by mixing 1.85 g. of the perchlorate salt and 0.2 g. of sodium hydroxide in 50 ml. of ethanol. Ether (150 ml.) was then added to the reaction mixture and the resulting light green solution was washed with dilute aqueous solution of sodium chloride to remove excess alkali and sodium perchlorate. The remaining green organic solution was dried over sodium sulfate, filtered and concentrated under vacuum. The concentrated dark green solution was dissolved in 150 ml. of ethanol and then vigorously stirred with 40 ml. of 0.0725 N aqueous solution of a sulfonated polystyrene (molecular weight about 10,000; average of about 1.1 sulfonic acid groups per aromatic ring; about 54% of sulfonic acid groups as free acid, the remainder as sodium sulfonate groups). The resulting solution was treated with ether to give a reddish-brown powdery precipitate which was collected, washed with ether and dried to give about a 75% yield of product salt melting above 300° C. and having infrared absorption. Maxima at the following wave lengths (microns): 3.00, 6.25, 6.65, 7.30, 7.40, 7.80, 7.95, 8.15, 8.60, 9.05, 9.65, 10.10, 10.65, 10.90, 12.15, 13.00, 13.65, 14.90, and 15.6. The salt can be readily dissolved in boiling water to give a solution which remains stable upon cooling to room temperature or below.

EXAMPLE 15

*Preparation of 1,1,5,5-tetrakis[4-(N,N-dimethylamino)phenyl]divinylcarbonium salt of gluconic acid*

A stock solution of the carbonium base was prepared by converting 0.5 g. of the carbonium perchlorate to the carbonium base in much the same manner as described in the preceding Example 14, and then diluting the base to 125 ml. in benzene. To 0.3 ml. of this stock solution there was added 5 ml. of a 0.1 molar solution of gluconic acid in water. The mixture was boiled to remove benzene, thereby leaving an aqueous solution of the desired 1,1,5,5-tetrakis[4-(N,N - dimethylamino)phenyl]divinylcarbonium gluconate.

EXAMPLE 16

*Preparation of 1,1,5,5-tetrakis[4 - (N,N-dimethylamino)-phenyl]divinylcarbonium salt of polycarboxylic acid (ammoniated copolymer of isobutylene and maleic anhydride)*

One-tenth gram of a polycarboxylic acid prepared by ammoniation of the copolymer of isobutylene and maleic anhydride (1:1 mole ratio of monomers, average molecular weight about 150,000–200,000) was dissolved in 100 ml. of water. Ten milliliters of the resulting aqueous solution was added to 0.5 ml. of carbonium base stock solution (see Example 15), and the mixture was boiled, thereby removing benzene and leaving an aqueous solution of the desired compound 1,1,5,5-tetrakis[4-(N,N-dimethylamino)phenyl]divinylcarbonium polycarboxylate.

EXAMPLE 17

*Preparation of 1,1,5,5-tetrakis[4-(N,N - dimethylamino)-phenyl]divinylcarbonium salt of polyacrylic acid*

A solution of polyacrylic acid was prepared by dissolving 0.01 grams of the acid (molecular weight about 100,000) in 100 ml. of water. Ten milliliters of this solution was added to one-half milliliter of the carbonium base stock solution (see Example 15) and the resulting solution was boiled, thereby removing the benzene and leaving an aqueous solution of the desired carbonium acrylate.

EXAMPLE 18

*Preparation of 1,1,5,5-tetrakis[4-(N,N - dimethylamino)-phenyl]divinylcarbonium salt of hydrolyzed copolymer of ethylene and maleic anhydride*

One one-hundredth grams of a polycarboxylic acid formed by hydrolysis of a copolymer of ethylene and maleic anhydride (1:1 mole ratio of monomers, molecular weight about 1500) was dissolved in 100 ml. of water. Ten milliliters of the resulting solution was mixed with one-half milliliter of the carbonium base stock solution (see Example 15) and the mixture was boiled, thereby removing the benzene and leaving an aqueous solution of the desired carbonium polycarboxylate. A trace of sodium bicarbonate was added to facilitate solution of the salt in water.

EXAMPLE 19

*Preparation of 1,1,5,5-tetrakis[4-(N,N - dimethylamino)-phenyl]divinylcarbonium salt of mucic acid*

Three-tenths milliliters of the carbonium base stock solution (see Example 15) was mixed with 5 ml. of a 0.05 molar solution of mucic acid in water. The resulting mixture was boiled, thereby removing benzene and leaving an aqueous solution of the desired carbonium mucate.

The following example illustrates the marked effectiveness of the various dyes of the present invention in increasing the rate of evaporation of water exposed to solar radiation.

EXAMPLE 20

Nine hundred ninety-nine and one-half gram quantities of water were placed in each of three 17.5 cm. crystallizing dishes. In one dish 10 p.p.m. of a phthalocyanine dye was dissolved. In a second dish 10 p.p.m. of the polymethine dye as prepared in Example 14 was dissolved in the water. The third dish was left with no additive in the water. The three dishes were placed on white paper out of doors in open sunlight and allowed to stand for about 8 hours. The dishes were weighed periodically to determine the rate of evaporation of water from the dishes. The results are tabulated in the following table:

| Sample | Water lost by evaporation (grams) | Rate of evaporation at steady state (grams/hr.) | Percent increase in evaporation rate |
|---|---|---|---|
| A. Water with 10 p.p.m phthalocyanine dye (Pontamine Fast Turquoise) | 140.5 | 21.1 | 29 |
| B. Water with 10 p.p.m. polymethine dye (of Example 14) | 194 | 29 | 78 |
| C. Water with no additive | 109.5 | 16.3 | |

From the foregoing examples it can be seen that the phthalocyanine dyes and polymethine dyes have a very marked effect upon the rate of solar evaporation of water. It can also be seen that the novel water-soluble polymethine dye salts which constitute preferred embodiments of the present invention are over twice as effective in increasing this solar evaporation rate as are the less preferred (though still very effective) phthalocyanine dyes.

We claim:
1. The method of increasing the rate of evaporation of aqueous solutions exposed to solar radiation, which method comprises incorporating into said solutions at least 5 p.p.m. of a polymethine salt of the class

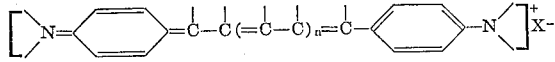

wherein $n$ is a positive integer, including 0, and wherein $X^-$ is the strong proton acid anion of a polybasic acid containing a sufficient number of hydrophilic groups to give the aforesaid salt a water-solubility of at least 5 p.p.m. and having only a portion of the acid groups therein neutralized by the polymethine dye base.

2. The method of claim 1 wherein the polybasic acid is a sulfonated polystyrene polymer in which not more than about half of the sulfonic acid groups have been neutralized by the polymethine dye base.

3. The method of claim 1 wherein the polybasic acid is a polycarboxylic acid having not more than about half of the carboxyl groups therein neutralized by the polymethine dye base.

4. The method of claim 1 wherein the polybasic acid is mucic acid.

References Cited
UNITED STATES PATENTS

| | | | |
|---|---|---|---|
| 2,813,802 | 11/1957 | Ingle et al. | 260—396 |
| 3,099,630 | 7/1963 | Wildi et al. | 260—2 |

OTHER REFERENCES

Venkataraman, "Synthetic Dyes," 1952, Academic Press, N.Y., pp. 1145, 1133 and 1146.

Ellis et al.: Chemical Action of Ultraviolet Rays, Reinhold Publishing Co., 1941, p .261.

GEORGE F. LESMES, *Primary Examiner.*

MURRAY TILLMAN, LEON J. BERCOVITZ,
*Examiners.*

N. F. OBLON, E. B. WOODRUFF, SAMUEL H. BLECH, *Assistant Examiners.*